United States Patent [19]

Bishop et al.

[11] Patent Number: 4,813,035

[45] Date of Patent: Mar. 14, 1989

[54] TRANSMULTIPLEXER VIRTUAL GROUP DISTRIBUTION FRAME

[75] Inventors: H. John Bishop, Milpitas; Morley M. Merriss, Montara; Thomas L. Ohlsson, Sunny Vale; Terrence G. Sopira, Mountain View, all of Calif.

[73] Assignee: Granger Associates, Santa Clara, Calif.

[21] Appl. No.: 926,973

[22] Filed: Nov. 4, 1986

[51] Int. Cl.$^4$ ............................................. H04J 4/00
[52] U.S. Cl. ........................................ 370/50; 370/53
[58] Field of Search ............. 370/50, 70, 110.3, 110.1, 370/53; 364/724

[56] References Cited

U.S. PATENT DOCUMENTS

| | | | |
|---|---|---|---|
| 3,585,306 | 6/1971 | Battocletti et al. | 370/53 |
| 4,075,429 | 2/1978 | Takahata et al. | 370/50 |
| 4,117,541 | 9/1978 | Ali | 370/50 |
| 4,131,766 | 12/1978 | Narashimha | 370/50 |
| 4,199,660 | 4/1980 | Dill et al. | 370/50 |
| 4,237,551 | 12/1980 | Narashimha | 370/50 |

OTHER PUBLICATIONS

Correspondence letter from Granger Assoc. to AT&T; Sopira; pp. 1-6; Jun. 12, 1985.

Primary Examiner—Douglas W. Olms
Assistant Examiner—Frank M. Scutch, III
Attorney, Agent, or Firm—Flehr, Hohbach, Test, Albritton & Herbert

[57] ABSTRACT

A transmultiplexer for use in a telephone system is disclosed. The transmultiplexer includes a programmable virtual distribution frame feature which provides for information traffic to be switched from one digital group facility to another analog facility in both time division multiplexed and frequency division multiplexed directions.

4 Claims, 21 Drawing Sheets

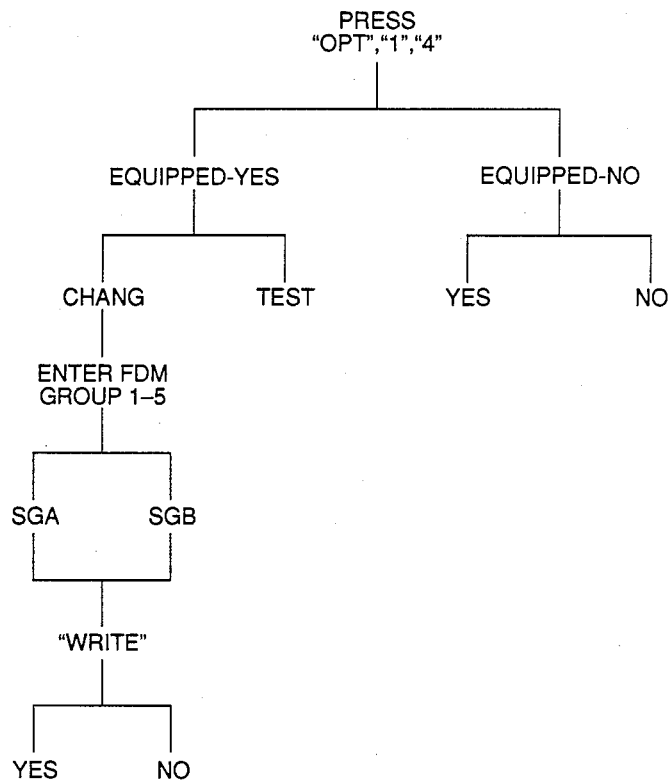
FIGURE 20-A

SYTEM OPTION 14: VGDF BOARDS

| STEP | PROCEDURE | RESPONSE |
|---|---|---|
| 1 | PRESS "OPT", "1", "4" | VGDF BOARDS<br>EQUIPPED<br>SELECT<br><u>YES</u>   EQUIPPED   <u>NO</u><br>SEL1                              SEL4 |
| 2 | TO CONFIGURE SYSTEM FOR USE WITH BYPASS CARDS:<br>PRESS "SEL4" | VGDF BOARDS<br>NOT EQUIPPED<br>DO YOU ACCEPT?<br><u>YES                              NO</u><br>SEL1                              SEL4 |
| 3 | PRESS "SEL1" | VGDF BOARDS<br>NOT EQUIPPED<br>SELECT<br><u>YES</u>   EQUIPPED   <u>NO</u><br>SEL1                              SEL4 |
| 4 | TO CONFIGURE SYSTEM FOR USE WITH VGDF<br>PRESS "SEL1" | VGDF BOARDS<br>EQUIPPED<br>SELECT<br><u>CHANG                      TEST</u><br>SEL1                              SEL4 |
| 5 | PRESS "SEL1" | PCM1  2  3  4  5<br>1A  3A  5A  2B  4B<br>2A  4A  1B  3B  5B<br>FDM GROUP (1 – 5) |
| 6 | IF THIS IS THE DESIRED CONFIGURATION<br>(STRAIGHT THROUGH—<br>NO GROUP SWITCHING):<br>PRESS "WRITE"<br>IF CHANGES ARE REQUIRED GO TO STEP 8. | PCM1  2  3  4  5<br>1A  3A  5A  2B  4B<br>2A  4A  1B  3B  5B<br><u>YES                              NO</u><br>SEL1                              SEL4 |
| 7 | PRESS "SEL1" | VGDF BOARDS<br>EQUIPPED<br>SELECT<br><u>YES</u>   EQUIPPED   <u>NO</u><br>SEL1                              SEL4 |

*FIGURE 20-B*

SYTEM OPTION 14: VGDF BOARDS

| STEP | PROCEDURE | RESPONSE |
|---|---|---|
| 8 | TO CHANGE THE GROUP CONFIGURATION FROM THE STEP 5 RESPONSE (STRAIGHT-THROUGH) TO INTERCHANGE GROUPS 1A AND 2B:<br>PRESS "2" | PCM1  2  3  4  5<br>2A  3A  5A  2B  4B<br>2A  4A  1B  3B  5B<br>SGA     SELECT     SGB<br>SEL1                              SEL4 |
| 9 | PRESS "SEL4" | PCM1  2  3  4  5<br>2B  3A  5A  2B  4B<br>2A  4A  1B  3B  5B<br>FDM GROUP (1 – 5) |
| 10 | PRESS "+/–", "+/–", "+/–", "+/–", "+/–",<br>AT THIS POINT THE "2" IN THE "2B" UNDER "PCM4" WILL BE BLINKING—<br>PRESS "1" | PCM1  2  3  4  5<br>2B  3A  5A  1B  4B<br>2A  4A  1B  3B  5B<br>SGA     SELECT     SGB<br>SEL1                              SEL4 |
| 11 | PRESS "SEL1" | PCM1  2  3  4  5<br>2B  3A  5A  1A  4B<br>2A  4A  1B  3B  5B<br>FDM GROUP (1 – 5) |
| 12 | PRESS "WRITE" — SINCE THIS IS THE CONFIGURATION DESIRED. | PCM1  2  3  4  5<br>2B  3A  5A  1A  4B<br>2A  4A  1B  3B  5B<br>YES     ACCEPT?     NO<br>SEL1                              SEL4 |
| 13 | PRESS "SEL1" — THE GROUPS ARE SWITCHED AND THE CONFIGURATION IS STORED IN THE EAROM. | VGDF BOARDS<br>EQUIPPED<br>SELECT<br>YES     EQUIPPED     NO<br>SEL1                              SEL4 |
| 14 | TO PLACE THE SYSTEM IN THE VGDF "TEST" MODE.<br>PRESS "SEL1"<br><br>NOTE— SERVICE WILL BE AFFECTED IN ANY SWITCHED GROUP. | VGDF BOARDS<br>EQUIPPED<br>SELECT<br>CHANGE                 TEST<br>SEL1                              SEL4 |

*FIGURE 20-C*

SYTEM OPTION 14: VGDF BOARDS

| STEP | PROCEDURE | RESPONSE |
|---|---|---|
| 15 | PRESS "SEL4" | VGDF BOARDS<br>EQUIPPED – IN TEST<br>DO YOU ACCEPT?<br>YES　　　　　　　　NO<br>SEL1　　　　　　　　SEL4 |
| 16 | PRESS "SEL1" | VGDF BOARDS<br>EQUIPPED – IN TEST<br>SELECT<br>YES　　EQUIPPED　　NO<br>SEL1　　　　　　　　SEL4 |
| 17 | TO REMOVE THE SYSTEM FROM VGDF "TEST" MODE PRESS "SEL1" | VGDF BOARDS<br>EQUIPPED<br>SELECT<br>CHANGE　　　　　　TEST<br>SEL1　　　　　　　　SEL4 |
| 18 | PRESS "SEL1" | PCM1　2　3　4　5<br>　　2B　3A　5A　1A　4B<br>　　2A　4A　1B　3B　5B<br>YES　　ACCEPT?　　NO<br>SEL1　　　　　　　　SEL4 |
| 19 | PRESS "SEL1" | VGDF BOARDS<br>EQUIPPED<br>SELECT<br>YES　　EQUIPPED　　NO<br>SEL1　　　　　　　　SEL4 |

FIGURE 20-D

TRANSMULTIPLEXER VIRTUAL GROUP DISTRIBUTION FRAME

BACKGROUND OF THE INVENTION

The present invention relates to a transmultiplexer and more particularly to a virtual group distribution frame.

A transmultiplexer is a telecommunications product used in telephone systems for translating any kind of information (e.g., voice and/or data information) between frequency division multiplexed (FDM) and time division multiplexed (TDM) formats. Transmultipexing systems are needed in providing a suitable interface between a analog environment on the one hand and a purely digital environment on the other.

Transmultiplexing systems provide the desired interface between digital time division multiplexed systems and analog frequency division multiplexed systems. Such systems are described, for example, in U.S. Pat. Nos. 4,131,766 and 4,237,551, which are commonly assigned to the same assignee as the present invention, the details of which are hereby incorporated by reference.

In a large telephone system environment (such as American Telephone and Telegraph network), two problems can occur with the use of a transmultiplexing system. The first problem is group administration of the network. Current operating procedures in a toll network dictate that the network is to be managed on a group level basis. Typically, a toll office is equipped with a DSX, a group transmultiplexer, a group distribution frame and group bank equipment. Diversity is accomplished by rerouting digroups and groups at the respective DSX and group distribution frame.

In order to provide for group cross-connects to be established, the required length of time for presently existing systems to physically establish group level analog/digital cross-connects is in terms of hours.

The second problem is that electronic data processing (EDP) systems have difficulty in coping with existing supergroup transmultiplexer arrangements. This is because a supergroup transmultiplexer interfaces with five T-1 digroup facilities and two supergroup facilities. Since groups are eliminated, management of the network on a group level is lost. Traditionally, the facility planning and scheduling systems require a hierarchy of equipment by which to slot groups. A group s connected into a group distribution frame, and then a connection is established into a group bank.

The problem with the foregoing is that groups are effectively eliminated and group EDP systems cannot cope with the loss of group management.

SUMMARY OF THE INVENTION

In view of the foregoing, it is an object of the present invention to provide an improved transmultiplexer for use in a telephone system.

It is a more particular object of the present invention to provide a transmultiplexer system which utilizes a virtual group distribution frame to permit programmable control for the cross-connect of digital groups to analog groups. Using, for example, a simple hand-held terminal, individual digital groups may be switched to individual analog groups.

The present invention comprises means connected between digital facilities and analog facilities for translating information (e.g., voice and/or data) between time division multiplexed (TDM) and frequency division multiplexed (FDM) formats, respectively.

The system further includes programmable control means for controlling the switching of information between the digital and analog facilities for both of the TDM and FDM formats.

Other objects, features and advantages of the present invention will become apparent from the following detailed description when taken in conjunction with the accompanying drawings.

BRIEF DESCRIPTION OF THE DRAWINGS

FIGS. 20-A through 20-D depict tables illustrating the operation of a VGDF board.

DETAILED DESCRIPTION OF THE DRAWINGS

Figure 1:
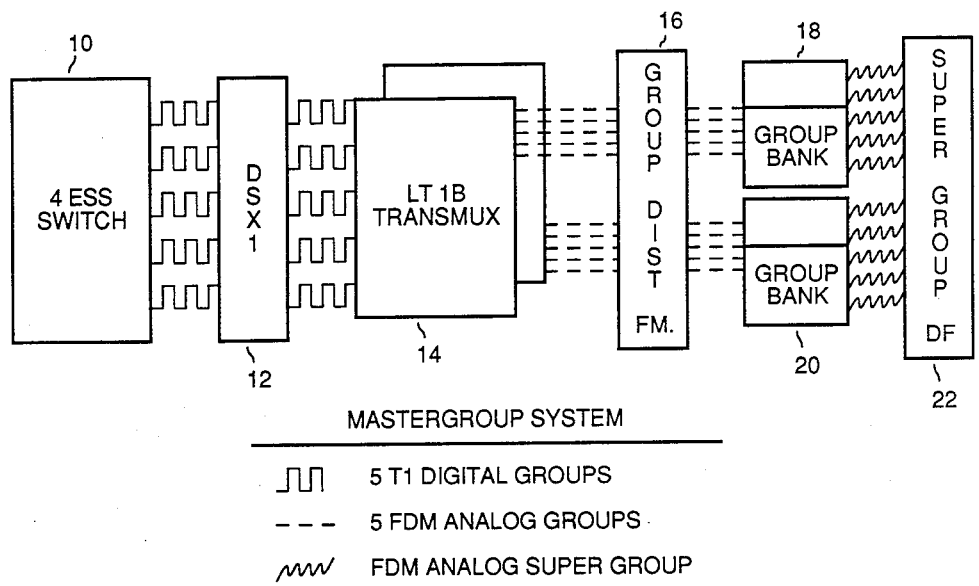
FIG. 1 depicts a typical application of a group Transmultiplexer.

Referring now to FIG. 1, a typical application of group transmultiplexer utilized in the prior art is depicted. The system includes a #4 ESS switch 10 (which is a toll center switching office well known in the art) and DSX 12 (digital cross-connect) connected to the digital side of transmultiplexer 14.

The analog side of transmultiplexer 14 provides for connection to a group distribution frame (GDF) 16 through to group banks 18, 20 to supergroup distribution frame 22.

The components and operation of such a system depicted in FIG. 1 is known in the art. Current operating procedures in such a system dictate that the network is to be managed on a group level basis. Typically, a toll office is equipped with a DSX, a transmultiplexer, a group distribution frame and group bank equipment, as depicted in FIG. 1. The diversity is accomplished by rerouting digroups and groups at the respective DSX and group distribution frame.

Figure 2:
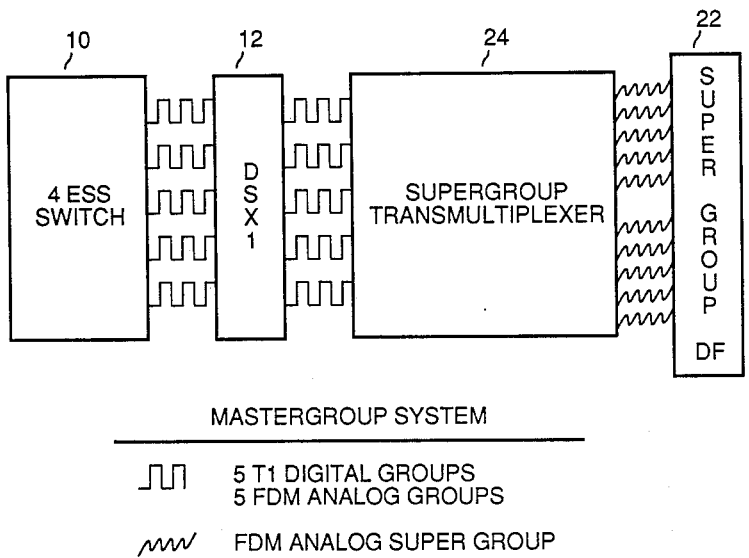
FIG. 2 depicts a typical application of a Supergroup Transmultiplexer.

FIG. 2 depicts a system 26 which would eliminate the transmultiplexer 14, group distribution frame 16 and group bank equipment 18, 20 of FIG. 1. While savings would amount by using such an arrangement, this would have been at the cost of losing group level management. The present invention overcomes this problem by allowing group cross-connects to be established through programmable control. In addition to having group administration of the network, a virtual group distribution frame (VGDF) allows group level analog/digital cross-connects to be established in seconds rather than hours. This further reduces the manpower and operating costs of a large network system.

Figure 3:
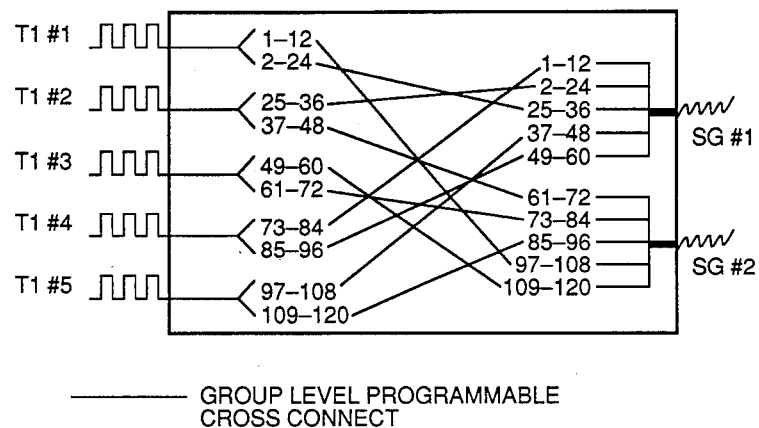
FIG. 3 depicts a schematic diagram of a Virtual Group Distribution Frame according to the present invention.

FIG. 3 depicts a diagrammatic view of group level programmable cross-connects utilizing a virtual group distribution frame. As can be seen in FIG. 3, five T1 lines can be programmably cross-connected to any one group of a plurality of supergroups (SG1 and SG2).

A VGDF incorporated with a transmultiplexer allows for the cross-connect of a group of 12 digital channels to any group of 12 analog channels under programmable control. Thus, five T1 facilities and two supergroups are divided into a group level within the transmultiplexer. Using a simple hand-held terminal, individual digital groups may be switched to individual analog groups.

As previously described, because a transmultiplexer could interface with five T1 digroup facilities and two supergroup facilities, an EDP system generally could not cope with this facility arrangement. Traditionally, facility planning and scheduling required a hierarchy of equipment by which to slot groups. Typically, this arrangement consisted of a T1 digroup routed through a group transmultiplexer and output as two group level analog facilities. The next step along the hierarchy is to connect the group into the group distribution frame and then a connection is established into the group bank.

One objection to utilization of a supergroup transmultiplexer is because groups were effectively eliminated and group EDP systems could not cope with the slotting of digroups. The VGDF aspect of the present invention eliminates this poblem. A transmultiplexer equipped with a VGDF contains the exact same routing and slotting paths that a present equipment configuration utilizes. Therefore, groups may still be routed through the transmultiplexer with little change required in operating procedures or EDP systems.

An EDP (electric data processing) coding scheme is possible that would be compatible with systems as described above. The coding scheme conceptually establishes a transmultiplexer, group distribution frame and group bank equipment as subsets of the entire system. Groups can therefore be slotted along a routing path similar to a manner that is accomplished presently.

A transmultiplexer equipped with a virtual group distribution frame reduces ongoing operating costs by a reduction in power and space, as well as major reduction in manpower expense through use of programmable cross-connects, as will now be described.

A transmultiplexer provides a direct, bilateral (two-way) interface between digital time division multiplex pulse code modulated (TDM-PCM) systems and analog frequency division multiplex (FDM) systems.

On th FDM side, the transmultiplexer interfaces analog facilities at the base supergroup level (312–552 KHz) via a supergroup distribution frame (SGDF). On the PCM side, the interface is at standard NorthAmerican DSI (24-channel, 1.544 Mb/S) T1 line level, and can terminate at a DSX-1, T1 span line, PCM channel bank, or a digital switch that accepts a DS1 channel.

A transmultiplexer uses a direct, high frequency supergroup conversion of voice and supervisory signaling, performing the functions of PCM channel banks, VF and signaling equipment, FDM channel banks, and group-to-supergroup translation equipment connected in tandem. It contains all of the common equipment required to convert five 24-channel DS1 signals (120 voice channels) into two basic 60-channel supergroups and to simultaneously convert each channel supervisory signal to 2600 Hz in-band tones.

All translation is performed digitally (there is no conversion to voice frequency) and all carrier supplies, pilots, and signaling tones are generated internally. No ancillary equipment is needed for basic operation of the system.

The programmable VGDF (virtual group distribution frame) overcomes the limitations imposed by a supergroup interface. The VGDF allows traffic to be switched from one group slot to another in both the PCM and FDM directions as needed by merely programming the transmultiplexer via a hand-held PCD (program, control and diagnostic) unit, or via a remote terminal. The VGDF can be incorporated directly into a transmultiplexer or retrofitted at a later time.

Figure 4:
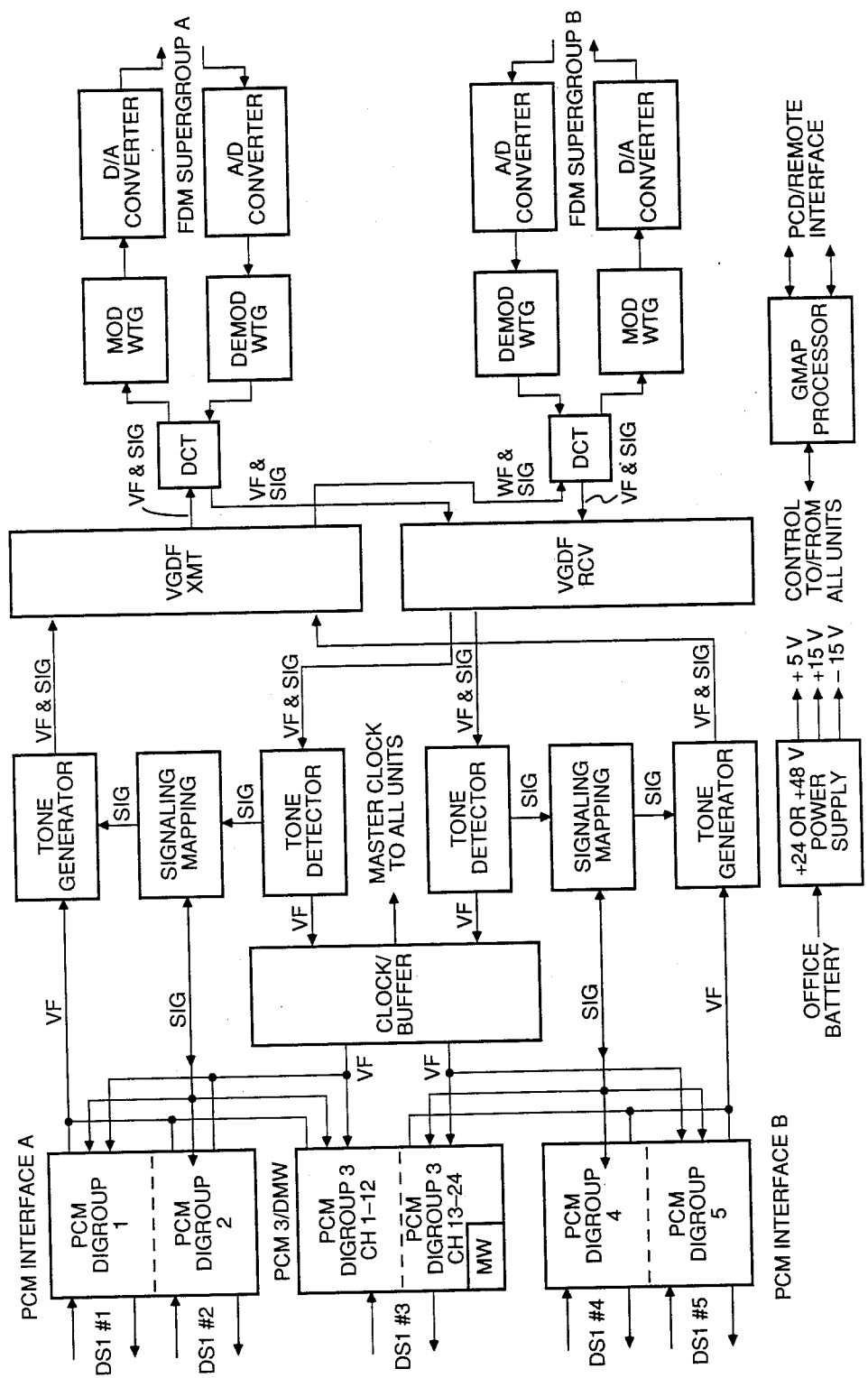
FIG. 4 depicts a more detailed block diagram of an improved transmultiplexer utilizing a Virtual Group Distribution Frame according to the present invention.

FIG. 4 depicts a block diagram of a transmultiplexer incorporating a virtual group distribution frame. The present invention is a user friendly system, using microprocessors and memory modules to provide local and remote provisioning, and other operational and maintenance capabilities. System and channel parameters can be programmed into the system via a PCD unit, which is essentially a hand-held data terminal, or via a local/remote terminal. The system and channel options are then stored in an electrically alterable read only memory (EAROM) on a maintenance alarm and programming unit. The unit controls system operation and communicates with all other units in the system.

The programmable feature permits maximum flexibility to be designed into a new transmission path. System and channel options can be selected and later changed by merely pressing the appropriate key on the PCD unit keypad or local/remote terminal, eliminating the need for strapping and/or plug-in changeouts. The program settings are retained by the EAROM in the event of a power failure or if the EAROM is unplugged. Installing an original EAROM in a replacement MAP unit eliminates the need for reprogramming the system.

The MAP processor also monitors the operation of the transmultiplexer and informs the user of equipment failures (either local or remote) through alarm indicators on the MAP front panel. The subdiagnostic routines are stored in separate non-volatile memory devices and can detect and isolate failures to specific plug units.

Figure 5:
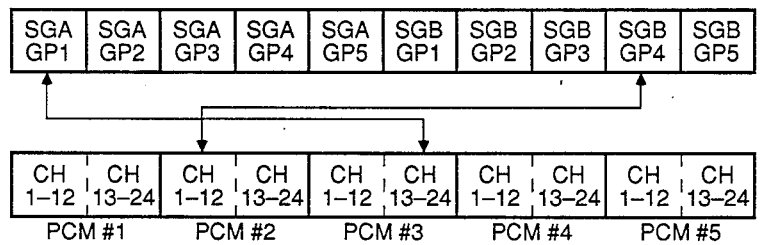
FIG. 5 depicts a diagram illustrating a group switching example according to the present invention.

FIG. 5 depicts a group switching example of the present invention. The VGDF allows a user to switch traffic, in both directions, from any 12-channel group to any other group slot by merely programming the unit via the PCD. For example, as shown in FIG. 5, Group 1 of supergroup A (channels 1 through 2) may be switched to channels 13 through 24 of PCM digroup #3 (channels 61 through 72). The first 12 channels of PCM digroup #2 (channels 25 through 36) can be switched to Group of supergroup B (channels 97 through 108).

When directed via the PCD to switch a group, the present invention holds the digitized VF and signaling information associated with that group for one frame, and then reinserts this data into the specified group slot.

Now that a general overview of the aspects of the present invention have been described, a detailed description of the improved transmultiplexer will now be discussed.

As previously described, FIG. 4 depicts a block diagram of the present invention. PCM Digroups 1 and 2, and half of PCM Digroup 3 (first 12 channels) are translated into Supergroup A. The second 12 channels of PCM Digroup 3 and PCM Digroups 4 and 5 are translated into Supergroup B. Lines designated "VF" and "SIG" denote the path of digitally encoded representations of this information and not the actual analog voice frequencies of signaling tones.

The PCM Interface of FIG. 4 transmits and receives five 24-channel DSI (1.544 Mb/s) bipolar bit streams. The operating mode of the PCM transmit and receive circuits is programmable. In addition to the normal D3/D4 format, these circuits can operate with extended frame format (EFF) or with B8ZS line code instead of the normal ZCS (zero code suppression). The robbed bit Channel Associated Signaling (CAS) format may be optionally disabled as well.

The FDM Interface of FIG. 4 transmits and receives two 312 to 552 kHZ analog supergroup signals, each supergroup consisting of 60 voice bandwidth channels (upper single-sideband, suppressed carrier). Channels within the two supergroups ar pre-programmed as follows with respect to the five DS1 signals (PCM digroups):

| Channels | 1st DS1 | 2nd DS1 | 3rd DS1 | 4th DS1 | 5th DS1 |
| --- | --- | --- | --- | --- | --- |
| 1-12 | SGA GP1 | SGA GP3 | SGA GP5 | SGB GP2 | SGB GP4 |
| 13-24 | SGA GP2 | SGA GP4 | SGB GP1 | SGB GP3 | SGB GP5 |

The present invention internally generates, inserts and monitors group and supergroup pilots for alarm and regulation purposes. The standard configuration provides a programmable 547.92 kHz pilot for each supergroup, and a combination of programming options allows generation and/or detection of a 100.08 kHz CFA (Carrier Failure Alarms) pilot in addition to the 104.08 kHz group pilot for each of the five groups within a supergroup.

The present invention is a user-friendly system, using microprocessors and memory modules to provide local and remote provisioning, and other operational and maintenance capabilities. System and channel parameters can be programmed into the system via the Program, Control and Diagnostic (PCD) unit, basically a hand-held data terminal, or via a local/remote terminal. These systems and channel options are then stored in an Electrically Alterable ReadOnly Memory (EAROM) on the Maintenance Alarm and Programming (MAP) unit. The MAP controls system operation and communicates with all other units in the system.

This unique programmable feature permits maximum flexibility to be designed into a new transmission path. System and channel options can be selected and later changed by merely pressing the appropriate key on the PCD unit keypad or local/remote terminal, eliminating the need for strapping and/or plug-in change-outs. The program settings are retained by the EAROM in the event of a power failure or if the EAROM is unplugged. In fact, installing the original EAROM in a replacement MAP eliminates the need for reprogramming the system.

The MAP processor also monitors the operation of the transmultiplexer and informs the user of equipment failures (either local or remote) through alarm indicators on the MAP front panel. These self-diagnostic routines are stored in separate non-volatile memory devices, and can detect and isolate failures to specific plug-in units. The PCD unit can be programmed to display, in plain English, the same information as the MAP indicators, or it can be queried for the results of an internal diagnostic routine that identifies failures to the plug-in level. Maintenance is normally limited to isolating any failures and replacing the defective plug-in module.

Although signal processing is discussed in analog terms, digital techniques are used for all functions except those on the FDM side of the actual D/A and A/D conversions.

Still referring to FIG. 4, signals in the PCM-to-FDM direction pass through the following plug-in units in the sequence listed below:

(a) PCM Interface Units and PCM 3/DMW: These units interface the five incoming PCM digroups to the internal data bus.

(b) Signaling Mapping Unit: This unit provides conversion between the PCM and FDM signaling formats.

(c) Tone Generator Unit: This unit digitally generates and adds the proper signaling tones to the VF channels.

(d) VGDF or Bypass Unit: VGDF (Virtual Group Distribution Frame) Identical VGDF units in the PCM-to-FDM and FDM-to-PCM directions allow traffic to be switched from one group slot to another in both directions by merely programming the hand-held PCD (Program, Control & Diagnostic) unit.

(e) Discrete Cosine Transform (DCT) Unit: The unit transforms the PCM time domain information to FDM frequency domain.

(f) Modulator Weighting Network: This unit removes unnecessary sidebands generated in the DCT process, and digitally generates and adds the five group and five CFA pilots, and the supergroup pilot.

(g) Digital to Analog (D/A) Converter Unit: This unit converts the digitally-processed signal to an analog FDM signal.

In the FDM-to-PCM direction, signals pass through the plug-in units the following sequence:

(a) Analog to Dioital (A/D) Converter Unit: This unit converts the analog FDM input to a digital signal.

(b) Demodulator Weighting Network: This unit separates the individual channels from the composite input.

(c) Discrete Cosine Transform Unit: This unit transforms the frequency domain FDM information to time domain PCM.

(d) VGDF or Bypass Units: VGDF (Virtual Group Distribution Frame) - Identical VGDF units in the PCM-to-FDM and FDM-to-PCM directions allow traffic to be switched from one group slot to another in both directions by merely programming the hand-held PCD (Program, Control and Diagnostic) unit.

(e) Tone Detector Unit: This unit detects the signaling tones for each channel and the level of the five group and five CFA pilots and the supergroup pilot.

(f) Sionalino Mapping Unit: This unit converts the FDM signaling format to a PCM signaling format.

(g) Clock/Buffer Unit: The VF side of this unit buffers the digital PCM channel signals to remove accumulated jitter.

(h) PCM Interface Units and PCM 3/DMW Unit: These units interface the internal data bus to the individual PCM channels.

Incoming DS1 signals enter the transmultiplexer at the T1 RCV connections on the shelf backplane. PCM Digroups 1 and 2 are applied to PCM Interface Unit A, PCM Digroup 3 is applied to the PCM 3/DMW unit, and PCM Digroups 4 and 5 are applied to PCM Interface Unit B. Monitor access to each PCM input is provided by a bridging RCV MON bantam jack on the front of the PCM and PCM 3/DMW units. A lifting (breaking) RCV EQPT jack is available for inserting an external DSI signal for testing. The PCM 3/DMW unit is identical in every respect to the PCM Interface Units, except that it processes only one PCM digroup. In place of the circuitry for processing the second digroup, the PCM 3/DMW provides circuitry for inserting a digital 1004 Hz tone for testing purposes.

Figure 6:
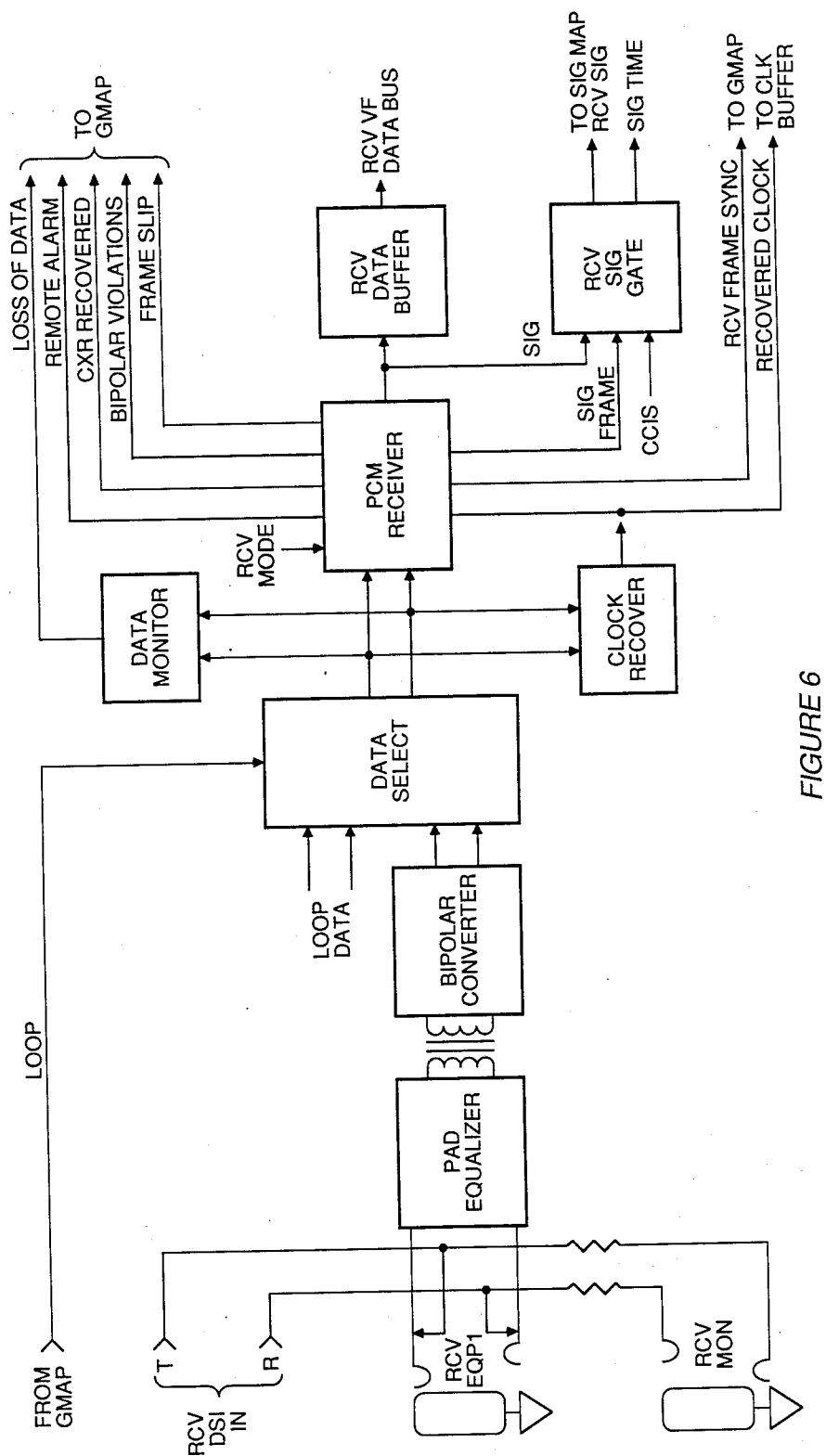
FIG. 6 depicts a block diagram of a PCM interface unit, RCV side.

Within the PCM Interface Unit (FIG. 6), the PCM signal passes through a 6 dB pad and is transformer-coupled to a bipolar converter that converts the bipolar PCM input to a unipolar signal. A data select circuit then passes this RCV-side signal to the PCM receive circuit; or, if directed by an input from the MAP unit, passes the looped XMT-side signal.

The output of the data select circuit is monitored for activity, and a loss-of-data signal is sent to the MAP unit if no activity is detected. A clock recovery circuit recovers the 1.544 MHz clock from the incoming bit stream and passes it to the PCM receive circuit, where it becomes the clock for the incoming (receive) side of the PCM Interface Unit. The recovered clock is also sent to the Clock Buffer Unit for system timing information.

The PCM receiver circuit converts the serial inputs to 8-bit parallel words, performs frame and superframe (12-frame) synchronization, and monitors the bit stream for bipolar violations or presence of a remote alarm code (suppressed bit 2). The signaling bits are separated from the encoded VM bits and sent to a receive signaling gate to provide signaling frame timing. If a valid PCM signal is present, the receiver circuit sends a CXR recovery signal to the MAP.

The operating mode of the PCM receiver circuit is programmable, controlled by input from the MAP unit. In addition to the normal D3/D4 mode, this circuit can operate with extended frame format (EFF) or with B8ZS line code input instead of the normal AMI (Alternate Mark Inversion).

The PCM receiver sends the VF data to a receive data buffer and then to the Tone Generator Unit. Signaling and signaling frame information is sent to the Signaling Mapping Unit.

Processing of PCM Digroup 3 through the PCM 3/DMW unit is identical to the PCM Interface Unit. However, information for channels 1-12 is sent to the A side Tone Generator, while information for channels 13-24 is sent to the B side Tone Generator.

Figure 7:
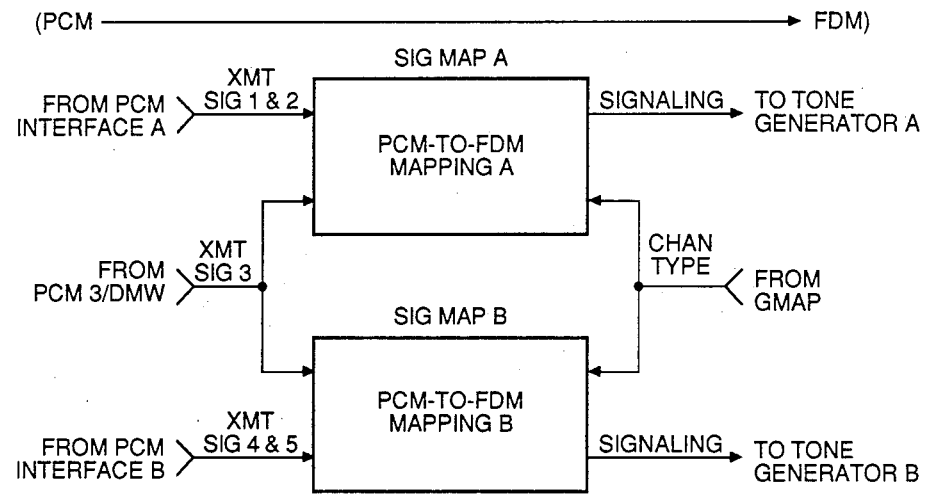
FIG. 7 a block diagram of a Signaling Mapping unit, RCV side.

The Signaling Mapping Unit (FIG. 7) accepts the signaling information for each channel from the PCM Interface and PCM 3/DMW units. The incoming PCM signaling bits are examined and mapped on a per-channel basis into tone on/off data required by the Tone Generator Unit. The signaling format for each channel is controlled by the MAP unit, based on the programmable information stored in its memory.

Figure 8:
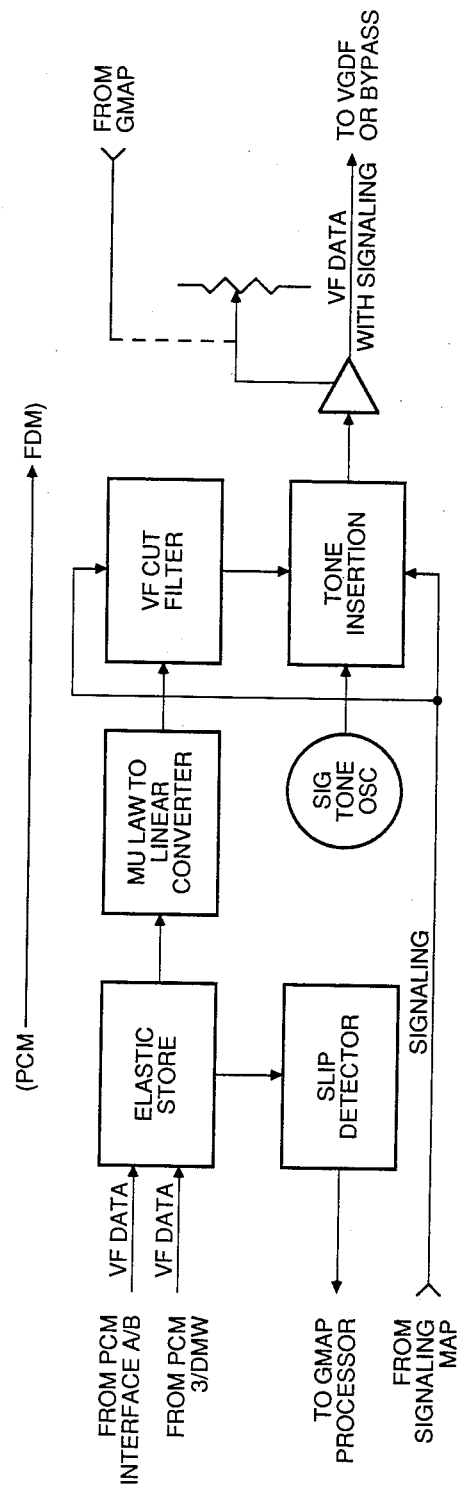
FIG. 8 depicts a block diagram of a Tone Generator unit.

The VF data from PCM Interface Unit A and channels 1-12 of the PCM 3/DMW Unit enter the Tone Generator Unit (FIG. 8) for side A. The VF data from PCM Interface Unit B and channels 13-24 of the PCM 3/DMW enter the Tone Generator Unit for side B. Data is written into an elastic store at the PCM clock rate and read out at the FDM clock rate. If data is written and read from the elastic store at different rates for too long a time, a controlled slip (one frame of data lost or repeated) occurs. A slip detector notifies the MAP of each slip, where an alarm is indicated if the slip rate becomes excessive.

The signal then goes through an 8-bit mu-law to 14-bit linear conversion, as the mu-law data is a compressed (non-linear) encoding method not usable by the FDM circuits. Controlled by the Signaling Mapping Unit, a VF-cut filter blocks the newly encoded VF signal from passing to the tone insertion circuit for 125 ms during transition from idle circuit (tone on) to busy (tone off). This ensures that the far end receives a clear interval of no tone in order to facilitate the recognition of circuit busy.

Signaling information in the analog portion of the TransMux is carried by an in-band 2600-Hz tone. An oscillator generates a digital equivalent of this tone, which is inserted into the digitally-encoded VF by a tone insertion circuit at the control of the Signaling Mapping Unit. The combined signal is then amplified to a gain level determined by the programmable value stored in the MAP memory (VF gain). The amplified signal is forwarded to the VGDF or Bypass Unit.

Figure 9:
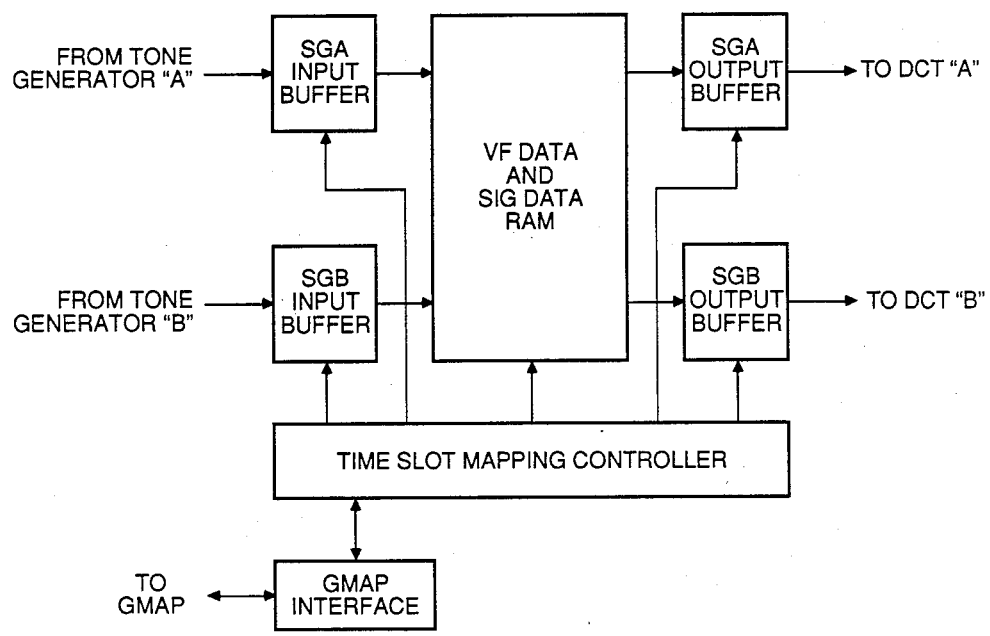
FIG. 9 depicts a block diagram of a VGDF unit.
Figure 9:
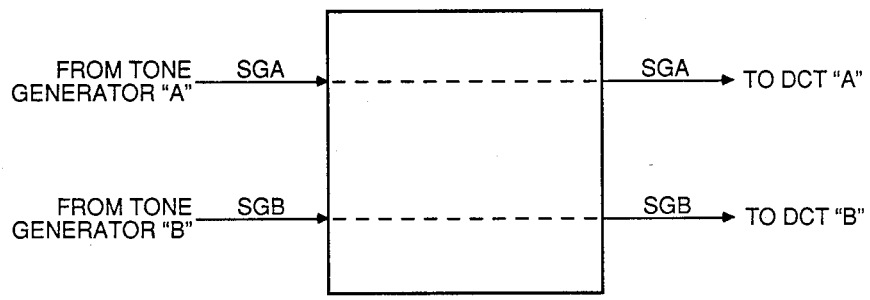

The VGDF Unit (FIG. 9) will switch a 12-channel group to another group slot upon a command from the MAP unit. VF and signaling data from the tone generator is placed in a buffer, where it is held for up to one frame. Data is sent from the buffer to the DCT unit in the order required to accommodate the group switching. The Bypass Unit, installed whenever a VGDF Unit is not equipped, is a passive unit which passes data directly from the Tone Generator Unit to the DCT Unit.

Figure 10:
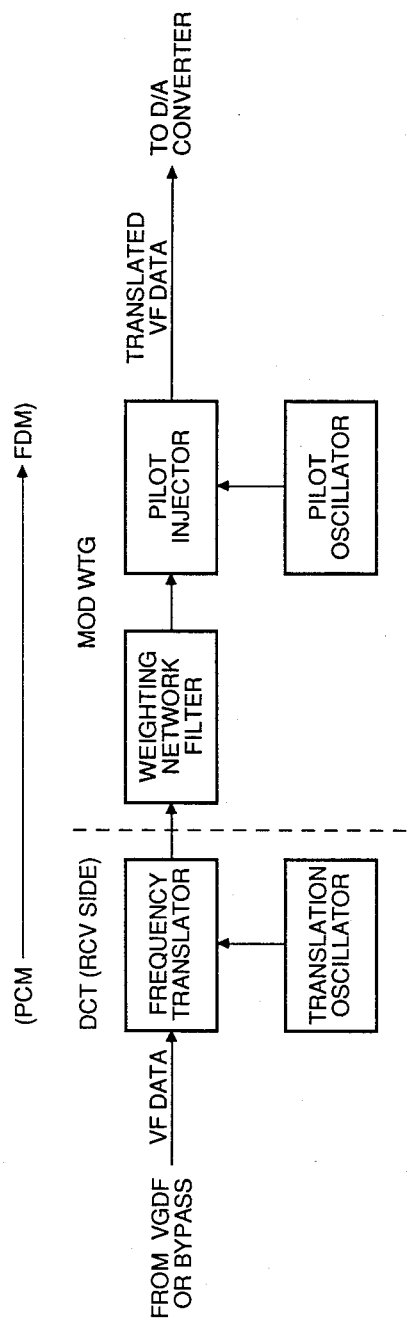
FIG. 10 depicts a block diagram of DCT and Modulator Weighting unit.

The Discrete Cosine Transform (DCT) and Modulator Weighting Network Units (FIG. 10) work together to convert the PCM time-domain information into FDM frequency-domain information. The VF data for each channel occupies a spectrum from approximately 0 to 4 kHz. A frequency translator in the DCT Unit shifts the VF baseband frequency of each channel up to the proper location in the FDM supergroup spectrum. Effectively, the translation oscillator changes frequency for each channel so that each channel is placed next to the previous channel in the supergroup.

The Modulator Weighting Network removes unwanted sidebands produced by this frequency translation. The pilot oscillator generates the five group pilots and the supergroup pilot, which are then added to the translated VF data by the pilot injector. In addition, the Modulator Weighting Unit provides the appropriate group delay factor for each time slot.

Figure 11:
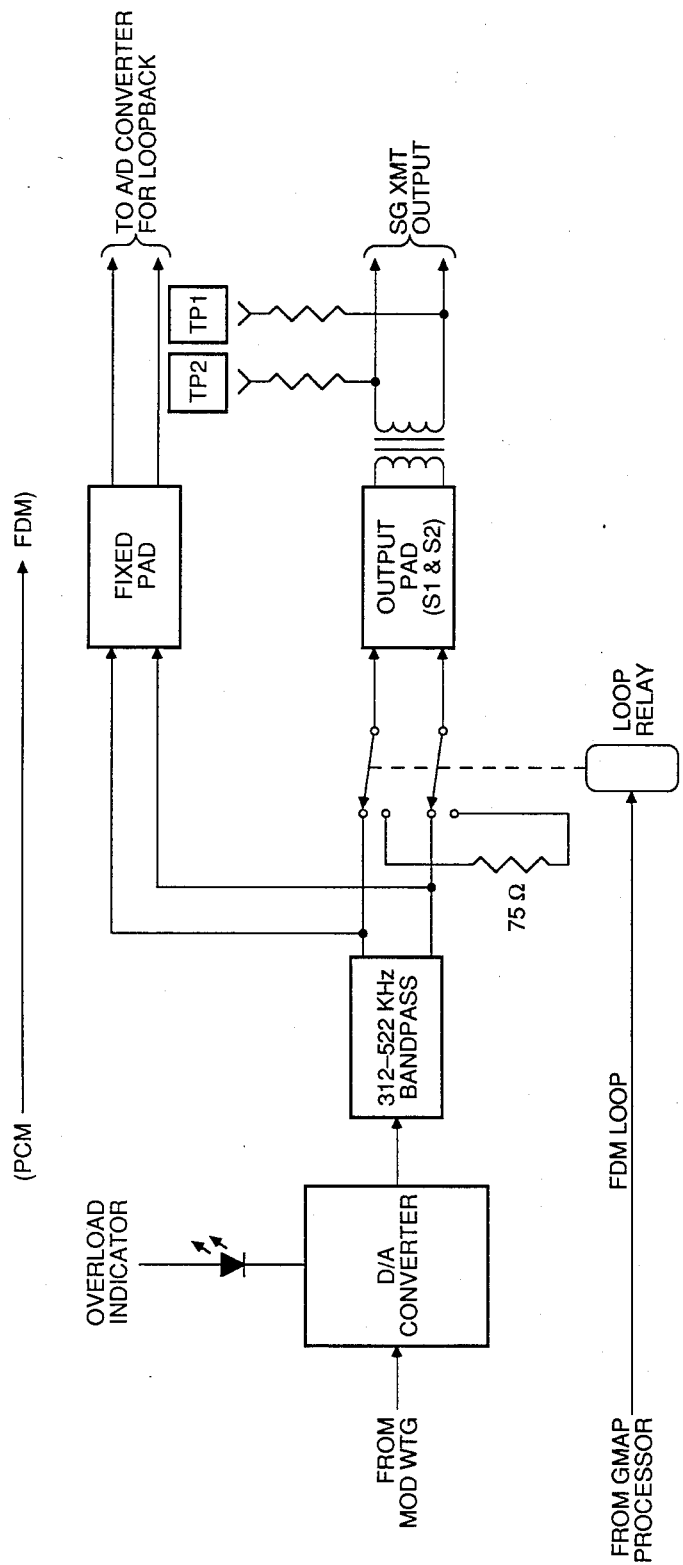
FIG. 11 depicts a block diagram of D/A converter unit.

The D/A Converter Unit (FIG. 11) converts the translated VF input into an analog signal at a level suitable for transmission on analog equipment. If the composite output power exceeds a threshold of +21 dBmO, a power output monitor mutes the FDM signal and lights a front panel indicator (DS1). This protects the analog baseband and radio equipment from overload in the event of transmultiplexer malfunction or if there is a digital milliwatt test tone on all channels simultaneously.

The signal is bandpass filtered to ensure that it is within the frequency limits of 312 to 552 kHz, is sent through an FDM loop relay to a variable output pad that can be set for 0 to 33.75 dB in 0.25 dB steps, and is then transformer coupled to the SG XMT connector on the shelf backplane.

When a loopback is directed by the MAP Unit, a loopback relay operates, breaking the signal path and directing the output of the bandpass filter through a fixed pad that matches the receive level requirements of the TransMux. The signal is then sent to the A/D Converter Unit and looped back in the PCM direction. A 75 ohm termination is provided towards the analog equipment.

Figure 12:
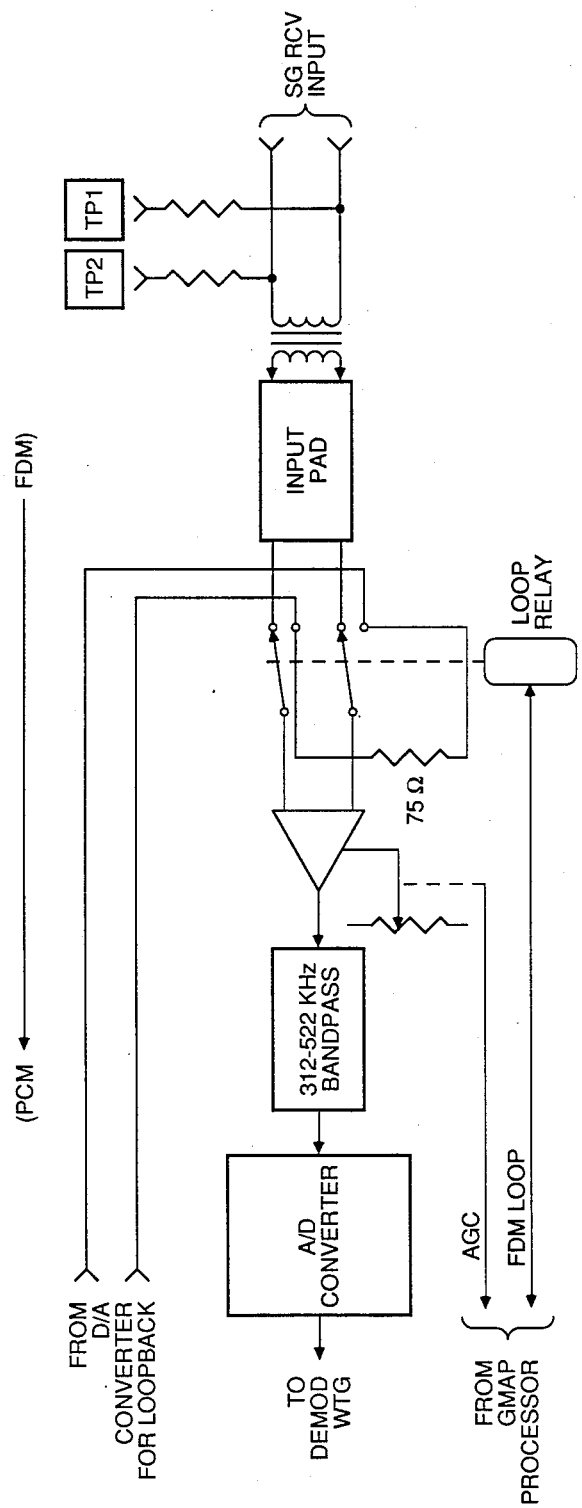
FIG. 12 a block diagram of A/D converter unit.

The FDM signal enters the A/D Converter Unit (FIG. 12) from the backplane RCV SG connector and is transformer-coupled to a variable input pad. This pad, like the one described in the PCM-to-FDM direction, provides 0 to 33.75 dB attenuation in 0.25 dB steps. The output of the pad passes through a set of relay contacts to an amplifier, the gain of which is regulated by the MAP when the programmable AGC is enabled. (The pilot levels are sent to the MAP, which returns a control signal to vary the amplifier gain as required to keep the signal level constant.)

The FDM signal is bandpassed filtered to reduce out-of-band noise and then applied to a converter circuit. The output of the converter circuit is a digital signal that is ready for demodulation.

When loopback is directed by the MAP, a loopback relay operates simultaneously with the loopback relay on the D/A Converter Unit to provide a loopback path for the output and input. The loopback relay breaks the signal path of the normal SG RCV input and terminates it in 75 ohms.

Figure 13:
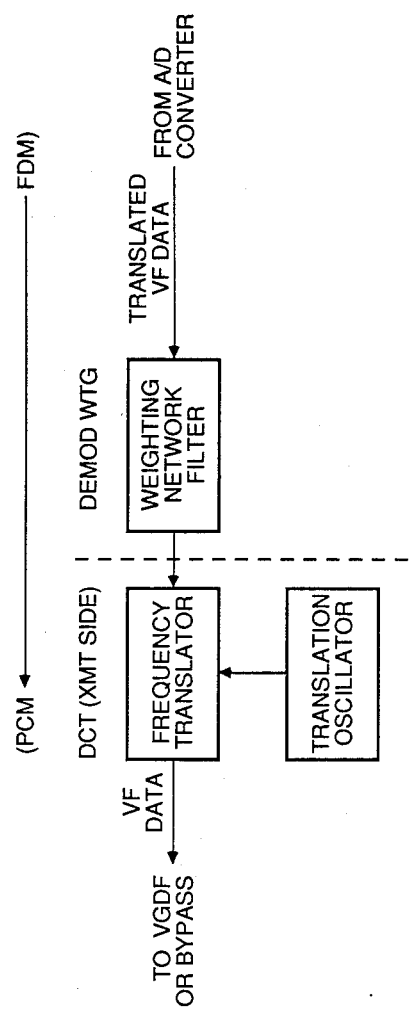
FIG. 13 block diagrams of DCT and Demodulator Weighting units.

The Demodulator Weighting Network and DCT Units (FIG. 13) work together in the reverse order as described in the PCM-to-FDM direction. The digital signal is first processed by the Demodulator Weighting Unit, which allows only one channel at a time to pass through the DCT Unit. As each channel enters the frequency translator, the translation oscillator changes to the correct frequency to shift the supergroup channel down to a 0 to 4 kHz VF baseband signal. The output of the DCT is then passed to the VGDF or Bypass Unit.

Figure 14:
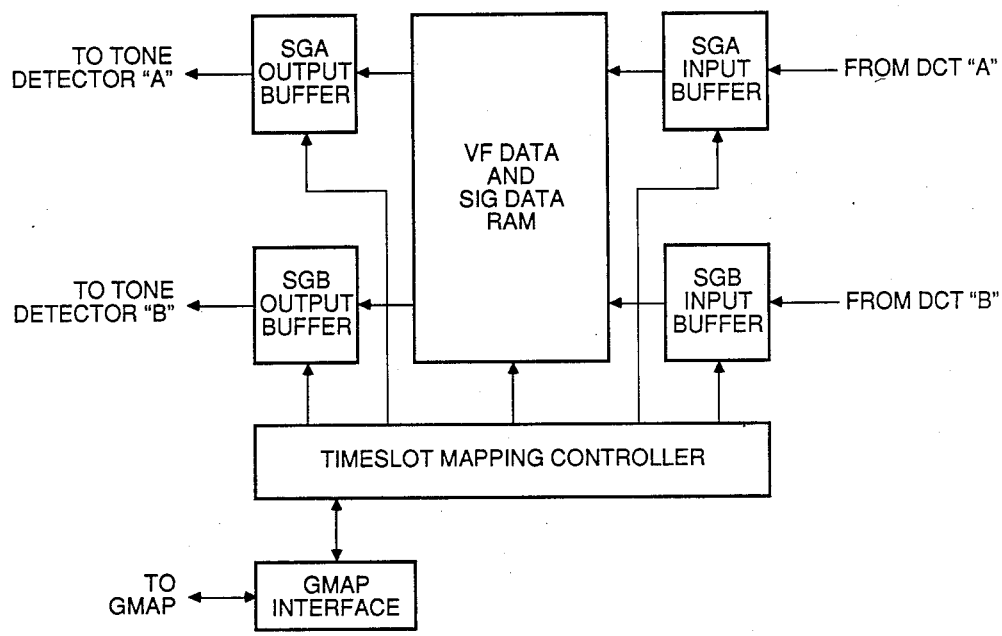
FIG. 14 depicts a block diagram of a VGDF unit.
Figure 14:
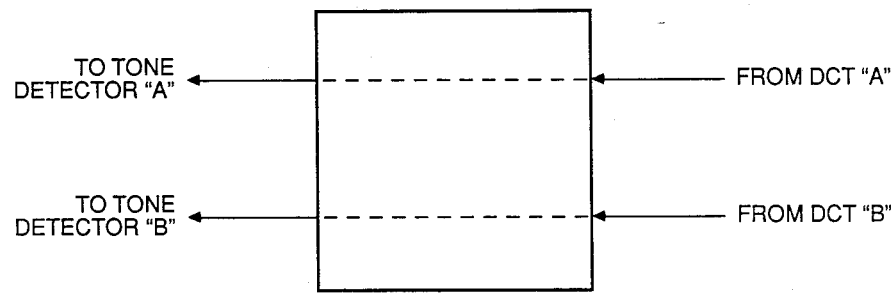

The VGDF Unit (FIG. 14) switches a 12-channel group to another group slot upon a command from the MAP unit. VF and signaling data from the DCT is placed in a buffer, where it is held for up to one frame. Data is sent from the buffer to the Tone Detector Unit in the order required to accommodate the group switching. The Bypass Unit, installed whenever a VGDF Unit is not equipped, is a passive unit which passes data directly from the DCT unit to the Tone Detector Unit.

Figure 15:
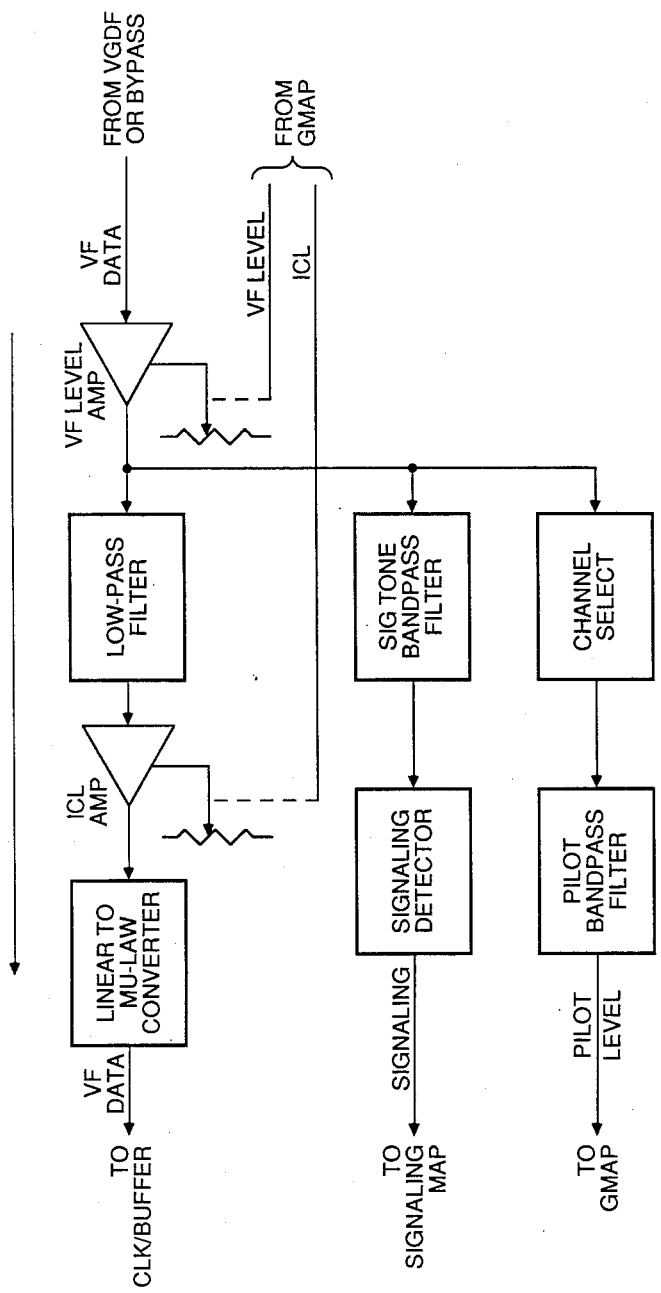
FIG. 15 depicts a block diagram of a Tone Detector.

VF data with signaling and pilot tones enters the Tone Detector (FIG. 15) and is amplified by a variable gain amplifier controlled by programmable level specifications stored in the MAP memory (VF level). (These VF level parameters can be adjusted ±3.0 dB in 0.1 dB steps.) The output of the amplifier is then split into three signal paths to perform the functions of separating the VF data, signaling tones and pilot tones.

In one path, the VF data passes through a low-pass filter that eliminates the pilot information from the voice data. The level of the voice data is adjusted again on a perchannel basis by the programmable Inserted Connection Loss (ICL) option stored in the MAP memory. The ICL can range from 0 to 6 dB in 0.1 dB steps. The VF data then goes to a linear to mu-law converter that translates the linearly coded data back to the mu-law companded data used by PCM equipment. The VF signal then passes to the VF side of the Clock/Buffer Unit.

In the second path, the output of the VF Level amplifier is sent through a 2600 Hz bandpass filter, which passes only the signaling tones to the signaling detector. The signaling detector determines whether the tone is on or off on each channel and sends this signaling information to the Signaling Mapping Unit.

In the third path, the output of the VF Level amplifier passes through a channel selector that allows only the information in those channels carrying the selected group and supergroup pilots to pass. A bandpass filter then filters out any other information on those channels and passes only the pilot levels to the MAP for loss-of-pilot alarm and AGC processing.

Figure 16:
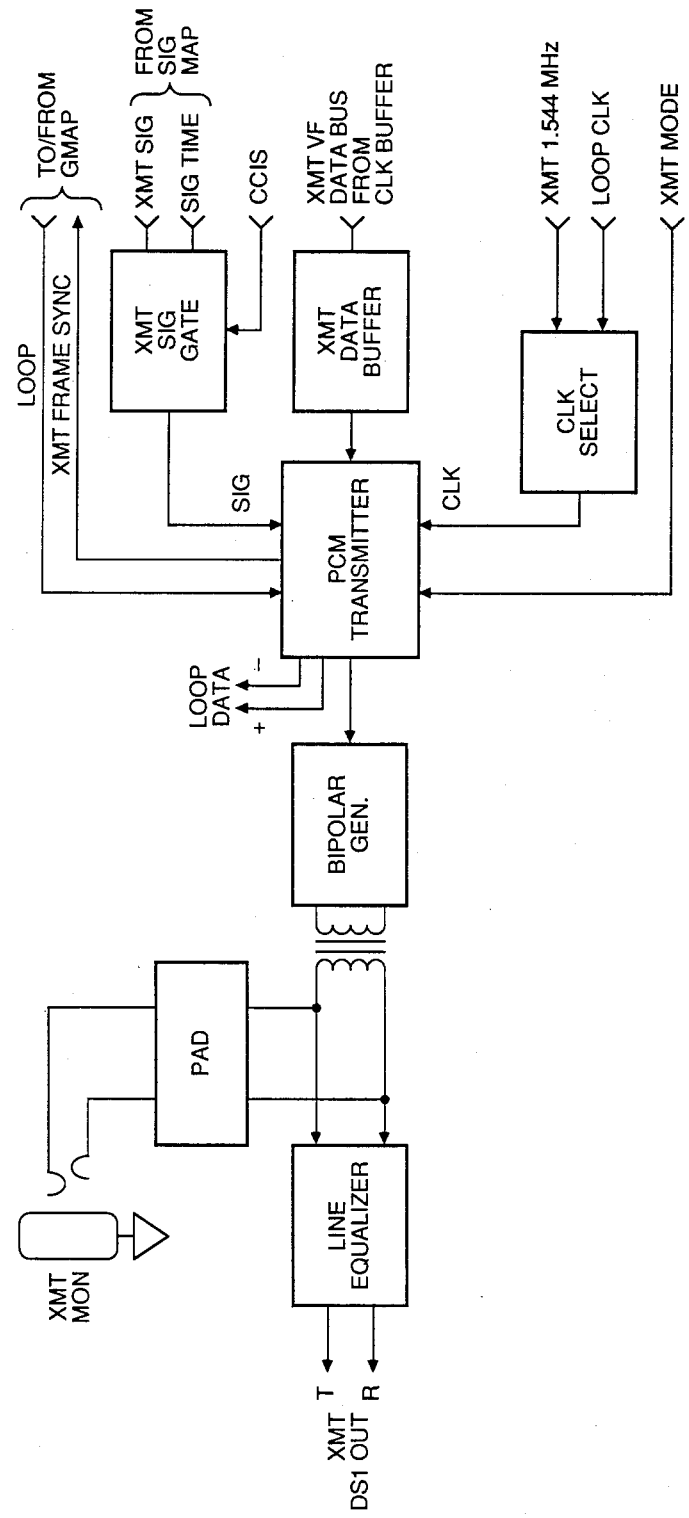
FIG. 16 depicts a block diagram of a Signaling Mapping unit, XMT side.

Signaling information from the Tone Detector Unit is processed through an FDM-to-PCM mapping module in the Signaling Mapping Unit (FIG. 16). The mapping module examines and stores the signaling status of each channel and generates the A-bit and B-bit signaling required by the PCM Interface and PCM 3/DMW Units. The actual format required for each channel is controlled by the programmable signaling option stored in the MAP memory.

Figure 17:
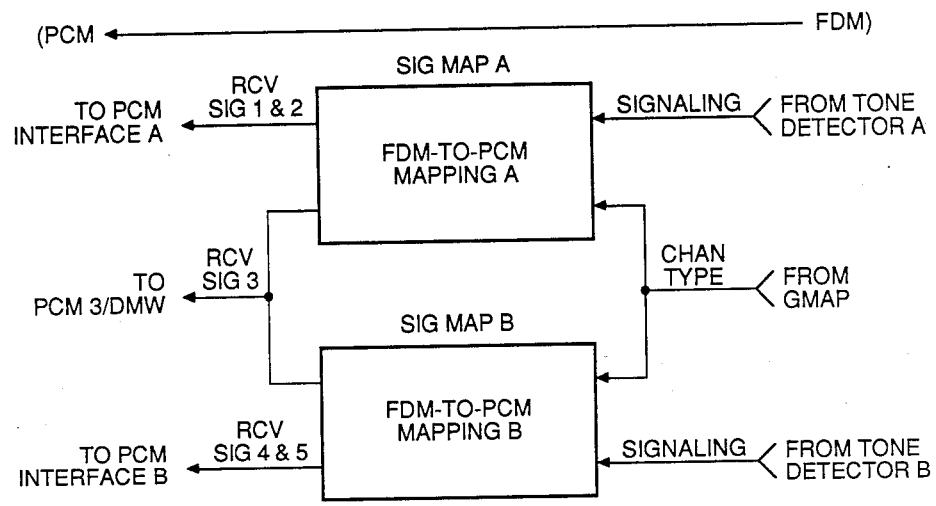
FIG. 17 depicts a block diagram of a Clock/Buffer unit.
Figure 18:
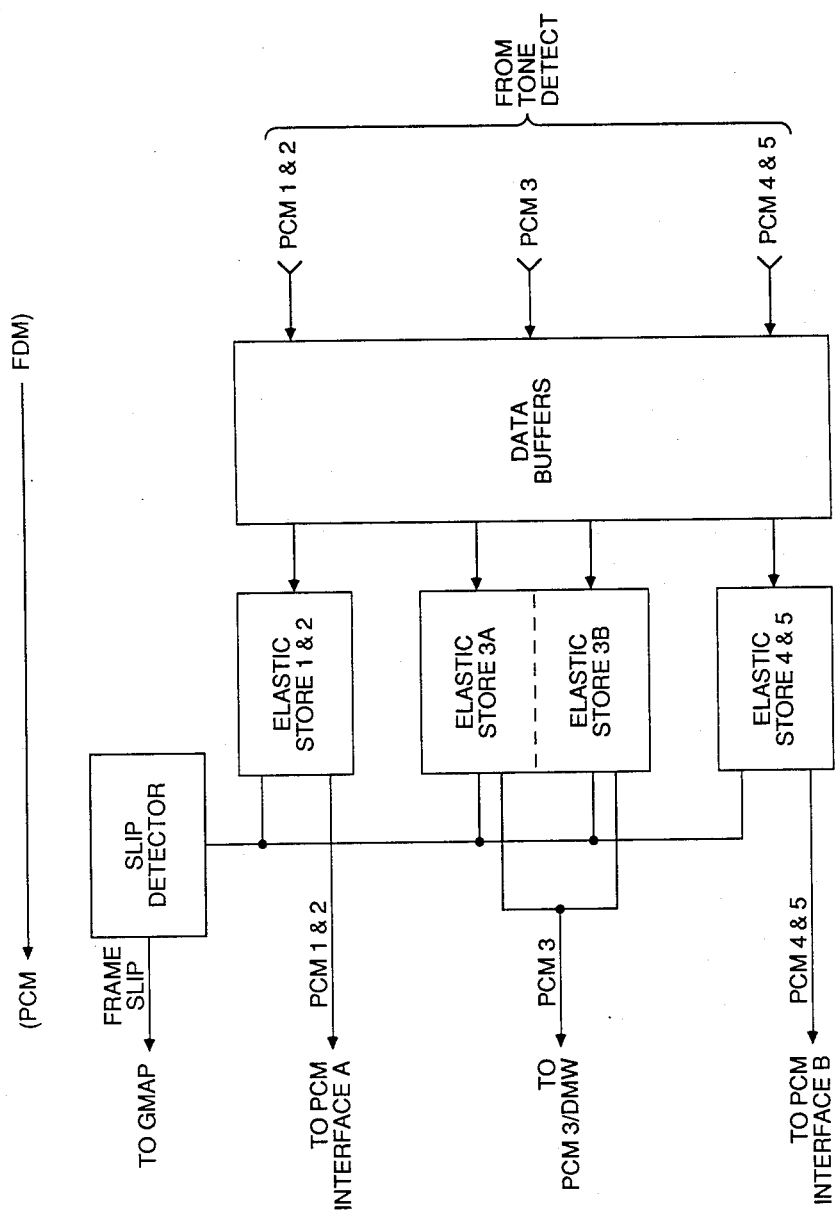
FIG. 18 depicts a block diagram of a PCM interface unit, XMT side.

The VF data from both Tone Detector Units (Side A and Side B) pass through a data buffer in the Clock/Buffer Unit (FIG. 17) and routed to the appropriate elastic store module. The elastic store is similar to the one used in the Tone Generator Unit, allowing for differences between the FDM master timing and PCM timing in the FDM-to-PCM direction. Data enters the elastic store at the FDM rate and exits at the PCM rate. If the elastic store write clock is at a different frequency from the read clock,, a controlled slip occurs (one frame of data lost or repeated) and the MAP Unit is notified by the slip detector. If the slip rate becomes excessive, the MAP will indicate an alarm. The elastic store also eliminates any jitter introduced by the transmultiplexing process.

The VF data bits from the Clock/Buffer data bus enter the transmit side of the PCM Interface Unit (or PCM 3/DMW) (FIG. 8) and pass through a data buffer before being sent to the PCM transmitter circuit. Signaling bits from the Signaling Mapping Unit enter the PCM Interface through a transmit signaling gate and then applied to the PCM transmitter circuit.

In the PCM transmitter, the parallel 8-bit word is converted to serial, combined with the appropriate signaling and framing bits,and the 1.544 MHz clock recovered from the Clock/Buffer Unit via a clock select circuit. The operating mode of the PCM transmitter circuit is controlled by an XMT MODE signal from the MAP Unit, based on a programmed option stored in MAP memory. As with the PCM receiver circuit, options include: normal D3/D4 mode, extended frame format (EFF), or B8ZS line code. In addition, the transmit mode allows selection of a loop mode and the transmission of a remote alarm.

The serial bit stream, with signaling, framing and timing added, is converted to bipolar by a bipolar converter and transformer-coupled to the output through a user-selected line equalizer that compensates for different cable lengths to the DSX-1 cross-connect. An XMT MON jack is provided to monitor the bipolar output just prior to the line equalizer.

When a PCM loopback is directed by the MAP Unit, the PCM transmitter sends the transmit data over the loop data path to the receive side, using the LOOP CLK instead of the recovered 1.544 MHz clock. During loop mode, the transmitter sends an "all ones" pattern to the bipolar generator. This is sent to the DSX-1 cross-connect until normal operation is resumed.

Figure 19:
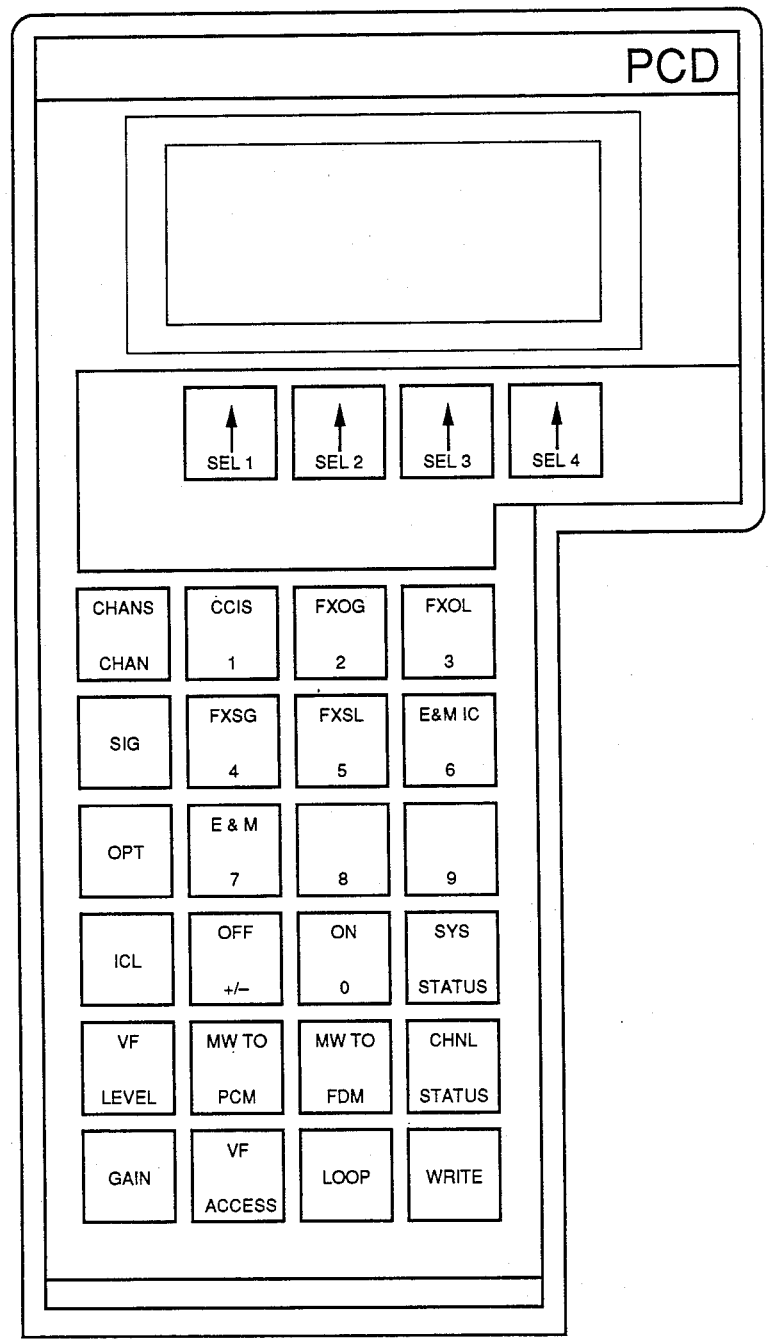
FIG. 19 depicts a front of a PCD unit.

In order to illustrate the VGDF feature of the present invention, assume for purposes of discussion that the VGDF feature is "OPTION 14." To program the VGDF, a user presses "OPT 1 4" of the PCD unit of FIG. 19. Press "SEL 1" if the VGDF boards are equipped, or "SEL 4" if bypass boards are installed. If the boards are equipped, press "SEL 1" to examine or change the configuration of "SEL 4" to temporarily select the default configuration to aid in testing (the user configuration will be retained in memory and reselected when the Mux is taken out of test mode). If "SEL 1" was pressed, the PCD will display a map of the current VGDF configuration as depicted in the Chart depicted in FIG. 20; below each PCM digroup, the FDM group assigned to channels 1-12 and 13-24 is shown. The entry which will be changed next will blink. As each entry is changed, the next will automatically be selected. To leave an entry as is, press "+/−". When all groups have been programmed, press "WRITE." (The TransMux will reject any invalid configurations; i.e., any group used more than once or not at all.) If a valid configuration has been entered, the PCD will prompt to accept, "SEL 1" or reject, "SEL 4," the configuration.

What is claimed is:

1. A transmultiplexer comprising
   means connected between digital facilities and analog facilities for translating information between time division multiplex (TDM) and frequency division multiplexed (FDM) formats on said digital and analog facilities, respectively, wherein information in said TDM format is connected via a plurality of multichannel T-1 type lines and wherein information in said FDM format is connected via a plurality of multichannel supergroups, and
   hand held type programmable control means for controlling the switching of information between said TDM and FDM formats, said programmable control means including means for controlling the switching of information between any one channel group to any other channel group.

2. A transmultiplexer as in claim 1 wherein said digital facilities include pulse code modulated (PCM) digroups, and wherein said analog facilities include supergroups.

3. A transmultiplexer comprising
   means connected between digital facilities and analog facilities for translating information between time division multiplexed (TDM) and frequency division multiplexed (FDM) formats on said digital and analog facilities, connected via a plurality of multichannel T-1 type lines and wherein information in said FDM format is connected via a plurality of multichannel supergroups, and
   a virtual group distribution frame, said distribution frame including hand held type programmable control means for controlling the switching of information between said digital and analog facilities for both said TDM and FDM formats, said programmable control means including means for controlling the switching of information between any one channel group to any other channel group.

4. In a transmultiplexer including means connected between dilgital facilities and analog facilities for translating information between time division multiplexed (TDM) and frequency division multiplexed (FDM) formats on said digital and analog facilities, respectively, wherein information in said TDM format is connected via a plurality of multichannel T-1 type lines and wherein information in said FDM format is connected via a plurality of multichannel supergroups,
   a virtual group distribution frame comprising hand held type programmable control means for controlling the switching of information between said digital and analog facilities for both said TDM and FDM formats, said programmable control means including means for controlling the switching of information between any one channel group to any other channel group.

* * * * *